(12) United States Patent
Erviti et al.

(10) Patent No.: US 11,643,061 B2
(45) Date of Patent: May 9, 2023

(54) PEDAL SIMULATION DEVICE WITH A PLURALITY OF RETURN ELEMENTS

(71) Applicant: ZF Active Safety GmbH, Koblenz (DE)

(72) Inventors: Carlos Erviti, Pamplona (ES); Jorge Trobajo, Mutilva (ES); Ana Maisterra, Mutilva (ES); Omayra Zapata, Funes (ES)

(73) Assignee: ZF Active Safety GmbH, Koblenz (DE)

(*) Notice: Subject to any disclaimer, the term of this patent is extended or adjusted under 35 U.S.C. 154(b) by 776 days.

(21) Appl. No.: 16/491,796

(22) PCT Filed: Mar. 13, 2018

(86) PCT No.: PCT/EP2018/056148
§ 371 (c)(1),
(2) Date: Sep. 6, 2019

(87) PCT Pub. No.: WO2018/172130
PCT Pub. Date: Sep. 27, 2018

(65) Prior Publication Data
US 2020/0377067 A1    Dec. 3, 2020

(30) Foreign Application Priority Data

Mar. 22, 2017 (DE) .......................... 102017002770.6

(51) Int. Cl.
*B60T 7/04* (2006.01)
*B60T 8/40* (2006.01)

(52) U.S. Cl.
CPC .............. *B60T 8/409* (2013.01); *B60T 7/042* (2013.01)

(58) Field of Classification Search
CPC ....... B60T 8/409; B60T 8/4086; B60T 8/4081
See application file for complete search history.

(56) References Cited

U.S. PATENT DOCUMENTS

| | | | |
|---|---|---|---|
| 6,367,886 B1 * | 4/2002 | Shaw .................... | B60T 8/4086 303/50 |
| 2012/0007419 A1 * | 1/2012 | Sellinger ................ | B60T 8/409 303/15 |
| 2014/0138888 A1 * | 5/2014 | Kim ........................ | G05G 5/03 267/140.13 |
| 2016/0160892 A1 * | 6/2016 | Schepp ............... | F15B 15/1452 29/464 |
| 2017/0072929 A1 * | 3/2017 | Kim ........................ | B60T 11/20 |
| 2017/0327097 A1 * | 11/2017 | Saito ..................... | B60T 13/686 |

(Continued)

FOREIGN PATENT DOCUMENTS

| | | |
|---|---|---|
| DE | 102010053110 A1 | 6/2011 |
| DE | 102013018574 A1 | 5/2014 |

(Continued)

*Primary Examiner* — Brian J McGovern
(74) *Attorney, Agent, or Firm* — Robert James Harwood

(57) ABSTRACT

A pedal simulation device, comprising: a housing; an abutment region that is coupled with the housing in a substantially rigid manner; a piston that is received in the housing and can be moved in a direction of actuation by passing through successive first and second actuation phases; and a return device that is configured to exert a resetting force on the piston that acts counter to the displacement of the piston in the direction of actuation.

16 Claims, 7 Drawing Sheets

(56) References Cited

U.S. PATENT DOCUMENTS

| | | | | |
|---|---|---|---|---|
| 2018/0201247 A1* | 7/2018 | Koshimizu | ............. | B60T 11/34 |
| 2020/0001711 A1* | 1/2020 | Burke | ................... | B60T 8/409 |
| 2020/0247377 A1* | 8/2020 | Cadeddu | ................ | B60T 11/21 |
| 2021/0323520 A1* | 10/2021 | Yokoyama | ............... | B60T 11/18 |
| 2021/0339724 A1* | 11/2021 | Maruo | ................... | B60T 7/042 |

FOREIGN PATENT DOCUMENTS

| | | |
|---|---|---|
| DE | 102014009080 A1 | 4/2015 |
| DE | 102014215091 A1 | 2/2016 |
| DE | 102014224889 A1 | 6/2016 |
| DE | 102015200016 A1 | 7/2016 |
| WO | 2012152352 A1 | 11/2012 |
| WO | 2013113625 A1 | 8/2013 |

\* cited by examiner

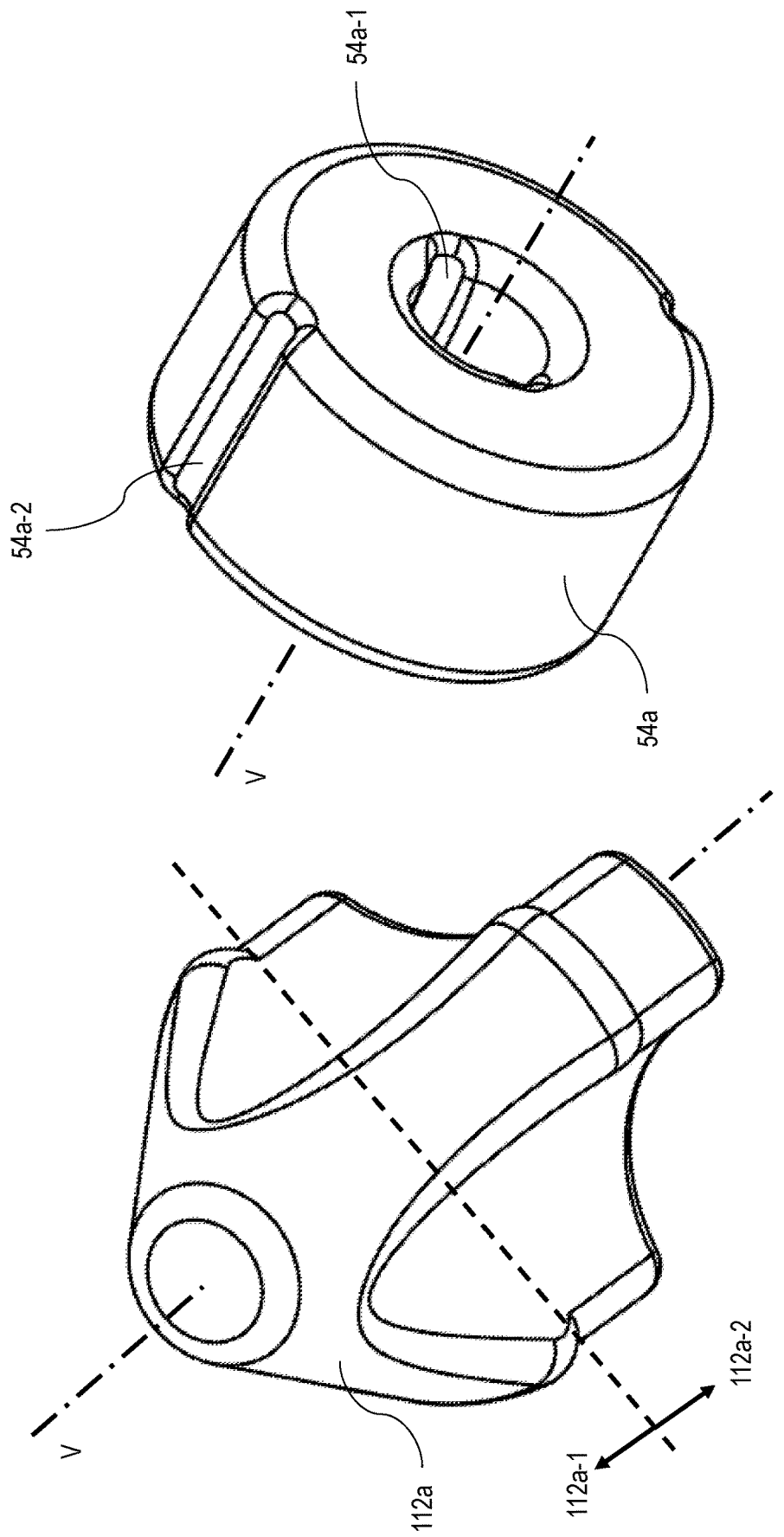

PEDAL SIMULATION DEVICE WITH A PLURALITY OF RETURN ELEMENTS

CROSS-REFERENCE TO RELATED APPLICATION

This application is a national stage of international Application No. PCT/EP2018/056148, filed Mar. 13, 2018, the disclosure of which is incorporated herein by reference in its entirety, and which claimed priority to German Patent Application No. 102017002770.6, filed 22 Mar. 2017, the disclosure of which is incorporated herein by reference in its entirety.

TECHNICAL FIELD

The present disclosure relates generally to the technical field of pedal simulation devices, particularly for automotive brake systems. More particularly, the present disclosure relates to a pedal simulation device in which a return device comprises a plurality of return elements that can be deformed in a predetermined manner and preferably in a substantially successive manner. The disclosure further relates to an automotive brake system comprising such a pedal simulation device and to a method for providing haptic feedback during actuation of the brake pedal.

BACKGROUND

The use of pedal simulation devices is known particularly in the field of automotive brake systems. Such pedal simulation devices are often used in conjunction with brake systems that include a brake actuator unit that can be operated independently of the driver (so-called "brake-by-wire systems"). For example, it is known to actuate the brake piston of a brake master cylinder by means of an electromechanical brake actuator unit and to generate desired braking forces in this way, at least during normal operation of the brake system. In that case, the driver-operated brake pedal does not act directly on the brake piston of a brake master cylinder. Instead, the pedal operation is detected by sensors in order to determine the driver's intention in terms of the degree of the desired vehicle deceleration and to derive control signals therefrom for the brake actuator unit.

In order to give the driver haptic feedback about the braking process despite this targeted uncoupling of the brake piston, the brake pedal interacts instead with a pedal simulation device. This is generally designed to generate predetermined resetting forces acting counter to the actuation of the brake pedal. It is thus possible to generate a resistance that is expected by the driver during the operation of the pedal that is suggestive of the building-up of hydraulic pressure for effective braking, for example. Such a solution can be found in WO 2012/152352 A1, for example.

Other variants of brake-by-wire brake systems make a provision that the pressure built up as a result of the driver's acting on the brake master cylinder via the brake pedal remains uncoupled from the wheel brakes at least during normal operation. Instead, the brake pedal and/or the brake piston is hydraulically coupled with a pedal simulation device, and effective hydraulic pressure for braking is provided by a pressure-generating unit that is actuated independently of the driver. In this case as well, the pedal operation is detected by sensors in order to determine the driver's intention in terms of the degree of the desired vehicle deceleration and to derive control signals therefrom for the brake actuator unit.

One aim of such pedal simulation devices is to provide the driver with a predetermined haptic feedback over a long period of operation. With the previously known approaches, however, this is only the case under certain conditions.

SUMMARY

A pedal simulation device is to be made available that can provide desired haptic feedback in a reliable and accurate manner.

The present disclosure provides a pedal simulation device comprising: a housing; an abutment region that is coupled with the housing in a substantially rigid manner; a piston that is received in the housing and can be moved in a direction of actuation by passing through successive first and second actuation phases; a return device that is configured to exert a resetting force on the piston that acts counter to the displacement of the piston in the direction of actuation; the return device comprising: a first elastically deformable return element having a substantially nonlinear spring characteristic, a second elastically deformable return element having a substantially linear spring characteristic, and a coupling unit, wherein the first and second return elements are configured so as to abut against one another at least as a result of an actuation of the brake pedal via the coupling unit, wherein the coupling unit can be displaced during the first actuation phase of the piston under deformation of predominantly or substantially solely the first return element, wherein the coupling unit is designed to abut against the abutment region upon completion of the first actuation phase in such a way that further displacement in the direction of actuation is prevented, and wherein the piston is configured so as to be displaced further in the direction of actuation when passing through the second actuation phase under deformation of predominantly or substantially solely the second return element.

The housing can comprise a cylinder or, in other words, a cylinder bore and define a pressure chamber together with the piston. A volume of brake fluid can be introduced into the housing in accordance with an actuation of the brake pedal in order to displace the piston within the housing.

In general, the piston can be displaceable along a displacement axis. This displacement axis can coincide with a longitudinal axis of the housing and/or of any cylinder bore thereof. Unless indicated otherwise or obvious, the terms "axial" and "radial" refer to this displacement axis in the context of the present disclosure. The displacement of the piston in the direction of actuation can correspond to a displacement in a direction along the displacement axis. As mentioned, this displacement can be decisively or solely in accordance with, for example, an active actuation of the brake pedal during which a hydraulic volume is introduced into the housing. On the other hand, a displacement contrary to the direction of actuation can occur decisively or solely under the action of the return device. This also preferably occurs when the driver stops actuating the brake pedal and/or releases the brake pedal, so that it returns to a non-actuated initial position.

The first actuation phase can comprise the displacement of the piston over a predetermined displacement path in the direction of actuation, particularly from a non-actuated initial position of the piston. Likewise, the first actuation phase can follow an initial actuation phase, which will be explained below. The second actuation phase can include the displacement of the piston over an additional predetermined displacement segment in the direction of actuation. The displacement segments of the first and second actuation phases—or also any initial actuation phase explained below—can adjoin one another directly or, in other words, merge into one another. Overall, the piston can be displaced over a maximum available displacement path in the direction of actuation. This displacement path can be composed of the above-described displacement segments of the respective actuation phases.

Furthermore, the displacement segments can be substantially identical. Alternatively, a displacement segment during the first actuation phase can be less than a displacement segment during the second actuation phase, or vice versa. Preferably, during the first actuation phase, the displacement segment exceeds the displacement segment of the second actuation phase (or vice versa) by a factor of no less than 1.2, no less than 1.6, no less than 2.0 or no less than 3.0.

The piston can also be embodied as a hollow cylinder and at least partially receive the return device (and, in particular, the second return element thereof), for example. The piston can be supported on the return device and exert forces in accordance with a displacement in the direction of actuation. According to one variant, the piston abuts against the second return element.

A development comprises, that the piston defines a receiving space with the housing that is formed independently of any pressure chamber. The return device can be accommodated in the receiving space. A displacement of the piston in the direction of actuation can be accompanied by an increase in the volume of the pressure chamber, in which case the volume of the receiving space decreases correspondingly and particularly by the same amount. When the piston is displaced counter to the direction of actuation, however, the volume of the pressure chamber can be reduced and the volume of the receiving space increased correspondingly and particularly by the same amount.

The abutment region of the pedal simulation device can be provided in a region of the housing that is located opposite to the piston. For example, the piston can be moved towards the abutment region in the event of a displacement in the direction of actuation. The abutment region can be at least partially embodied in a cover assembly that is coupled to the housing. Together with the housing, the cover assembly can define a possible receiving space in which the return device is received.

The substantially rigid coupling of the abutment region with the housing can include the possibility of generating a force flow between the abutment region and the housing that extends through elements that are substantially not elastically deformable or only slightly elastically deformable. In other words, it can be a mechanically rigid coupling. In general it could be provided that forces exerted on the abutment region can be introduced into the housing without the abutment region or an element comprising the abutment region undergoing any substantial displacement and/or deformation.

At a higher level, it is also possible to provide for an at least indirect supporting of the coupling unit against the abutment region at the beginning of the first actuation phase, but in such a way that a displacement of the coupling unit relative to the abutment region in the direction of actuation is still possible. In other words, there may be an axial gap between these elements at first. It is also possible for the coupling unit to be arranged on a guide region of the abutment region, as explained below. During the first actuation phase, the coupling unit is able to slide along the guide region while overcoming the axial gap. Upon completion of the first actuation phase, however, such supporting of the coupling unit on the abutment region can then be provided, for example as a result of coming into contact with a possible abutment surface of the abutment region, that no further displacement is possible in the direction of actuation.

The return device can generally provide a predetermined progression of the resetting force in response to a piston displacement in the direction of actuation. This progression can be referred to as a so-called simulation or pedal characteristic. The haptic feedback the driver receives at different points in time during actuation—or, in other words, when passing through different portions of the total available pedal actuation path—can be determined using the progression of the resetting force. For example, different resetting forces can be generated via a first pedal actuation segment, which may correspond to the above-explained first actuation phase of the pedal simulation device, than via a second pedal actuation segment that follows the first actuation segment and that can correspond to the second actuation phase of the pedal simulation device. At a higher level, a provision can be made that the resetting forces increase with continued pedal operation (and/or with continued displacement of the piston in the direction of actuation).

The first and second return elements can have differing spring characteristics over the total possible displacement path of the piston as seen in the direction of actuation. The substantially nonlinear spring characteristic of the first return element can mean that the spring characteristic has a nonlinear progression over at least part or most or all of the displacement path of the piston, at least as seen during the first actuation phase. This can be a generally curved and/or a progressive characteristic.

The substantially linear spring characteristic of the second return element can mean that the spring characteristic has a linear progression over at least part or most or all of the displacement path of the piston, at least as seen during the second actuation phase. In particular, this can be a linearly increasing characteristic with a pitch angle of greater than 30°, greater than 40°, greater than 50°, or greater than 60°.

The coupling unit can be displaceably received in the pedal simulation device and, in particular, in the housing (e.g., in a possible receiving space of the housing for the return device). The coupling unit can also be displaceable along the displacement axis. According to one variant, the coupling unit can be displaced at least in the context of the first actuation phase together with the piston in the direction of actuation and/or returned to an initial position upon completion of the pedal actuation counter to the direction of actuation.

The coupling unit can have a contact portion on which at least one of the return elements can be supported and/or abut directly against it. The contact portion can have the shape of a disc or plate. The contact portion can receive the displacement axis substantially in the center. The coupling unit can also have an interaction region by means of which it can be supported on the abutment region. The interaction region can extend from or be encompassed by the contact portion. The interaction region can comprise a receiving region (explained below) and can be embodied, for example, as an elongated hollow cylindrical region that extends along the displacement axis.

In general, the coupling unit can be positioned at least partially between the return elements along the displacement axis. Preferably, both return elements abut against the coupling unit. For example, the first return element can abut against a first side of the coupling unit and the second return element against a second side facing away therefrom. It may be provided that the return elements do not contact one another and/or are axially overlapping.

According to one variant, the first and second return elements are supported on the coupling unit substantially without a gap, even without brake pedal actuation (i.e., when the pedal simulation device is in a non-actuated state). Preferably, they abut directly against the coupling unit in a substantially backlash-free manner. The backlash-free state can also be substantially maintained during operation of the pedal simulation device.

During the first actuation phase of the piston, the latter can exert a force on the return device, which force, in particular, acts indirectly on the coupling unit via the second return element. The coupling unit can also be displaced in the direction of actuation in accordance with the piston displacement and, in particular, parallel and/or proportionally thereto. Accordingly, it can cover a displacement path, which may differ to a predetermined extent from the above-described displacement segment of the piston during the first actuation phase depending on the deformation of the return elements.

In the context of the present disclosure, a deformation of the first and second return elements (as well as of the intermediate return element explained below) can correlate particularly with a deformation along the displacement axis and/or in the direction of actuation. More specifically, this may include an axial change in length of the respective elements along the displacement axis—e.g., an axial compression. At a higher level, the displacement of the coupling unit during the first actuation phase can be converted into a deformation of the first return element, since the coupling unit and the first return element can be supported against one another. The first return element can be deformed in a manner corresponding substantially to the displacement of the coupling unit and, in particular, compressed axially.

On the other hand, during the first actuation phase, the second return element is deformed only slightly and, in particular, compressed axially only slightly. The return device can thus be deformed substantially in the vicinity of the first return element during the first actuation phase, so that the resetting forces generated during this actuation phase are also provided substantially by the first return element.

The predominant deformation of the first return element during the first actuation phase can mean that the first return element is deformed and, in particular, axially compressed to a greater extent than the second return element. For example, the first return element can be deformed (or axially compressed) to such an extent that a corresponding deformation of the second return element is exceeded by a factor of at least 1.5, at least 2.0, at least 4.0, at least 8.0 or at least 10.0 during the first actuation phase. Alternatively, it is possible for substantially only the first return element to be deformed during the first actuation phase, whereas the second return element remains substantially free of deformation. This can be the case, for example, if a deformation of the first return element exceeds a deformation of the second return element by a factor of greater than 20, greater than 30 or greater than 40.

In summary, it may be provided during the first actuation phase that the resetting forces of the return device are made available substantially or essentially solely by the first return element, whereas the resetting forces provided by the second return element are smaller or almost negligible. In other words, a progression of the resetting forces generated by the return device during the first actuation phase and hence a progression of the simulation characteristic can be determined substantially by the first return element, meaning that it can also have a substantially nonlinear progression.

Upon completion of the first actuation phase at the latest, the coupling unit can be supported on the abutment region and, in particular, immediately come into contact therewith. Until then, the coupling unit can be arranged so as to be free of contact with the abutment region or at least with an abutment surface thereof. According to the present disclosure, the support after the first actuation phase is such, that further displacement in the direction of actuation is prevented. In other words, the abutment region can block a continuation of the joint displacement of the coupling unit and the piston in the direction of actuation from this point in time onward.

The second actuation phase can begin immediately after further displacement of the coupling unit is prevented. Upon further displacement of the piston in the direction of actuation, substantially no further deformation of the first return element can occur, particularly due to the lack of further displacement of the coupling unit. Instead, the first return element can substantially maintain the state of deformation at the end of the first actuation phase.

Again, the predominant or solely deformation of the second return element during the second actuation phase can mean that the second return element is deformed and, in particular, axially compressed to a greater extent than the first return element. For example, the second return element can be deformed (or axially compressed) to such an extent that a corresponding deformation of the first return element is exceeded by a factor of at least 1.5, at least 2.0, at least 4.0, at least 8.0, or at least 10.0 during the second actuation phase. Alternatively, it is possible for only the second return element to be deformed during the second actuation phase. The first return element, on the other hand, can maintain a substantially constant state of deformation. This can be the case, for example, if a deformation of the second return element exceeds a deformation of the first return element by a factor of greater than 20, greater than 30, or greater than 40.

In summary, a provision can thus be made during the second actuation phase that the resetting forces of the return device are made available substantially or essentially solely by the second return element, whereas the resetting forces provided by the first return element are smaller and/or do not undergo any significant further changes. In other words, a progression of the resetting forces generated by the return device and hence a progression of the simulation scan line during the second actuation phase can be determined substantially by the second return element, meaning that it can also have a substantially linear progression.

One development provides that the first return element is designed to maintain a substantially constant state of deformation during the second actuation phase. For this purpose, the first return element can be arranged at least partially between the coupling unit, which cannot be displaced further during this actuation phase, and an oppositely situated housing region. In general, the first return element cannot undergo any additional axial compression in the second actuation phase, and preferably no axial relaxation, either—meaning that it cannot undergo any axial extension.

The second and first return elements can be generally arranged to act in series. In particular, the return elements can be arranged in series or, in other words, in succession as viewed along the displacement axis. In this context, the coupling unit can also be arranged axially between the return elements at least in part. In general, however, axial overlaps between the return elements and/or the coupling unit are conceivable.

According to one variant, the second return element is supported with a first end region on the piston and with a second end region on the coupling unit. The first and second end regions can be spaced apart along the displacement axis and/or form axial end regions of the second return element. The end regions can face toward the coupling unit and the piston, in which case at least one of the end regions preferably abuts directly against the coupling unit or the piston. On a higher level, the second return element can thus be arranged axially between the piston and the coupling unit and/or axially between the piston and the first return element, at least in part.

Additionally or alternatively, the first return element can be supported with a first end region on the coupling unit and with a second end region on a bottom region of the housing. The bottom region can be axially opposite the piston and/or comprise the abutment region at least partially. In particular, the bottom region can be encompassed by a lid assembly that preferably defines a receiving space for the return device with the piston. The end regions, in turn, can be end regions of the first return element that are spaced apart from one another when viewed along the displacement axis and/or axial end regions of the first return element. The end regions can face toward the coupling unit and the bottom region, in which case at least one of the end regions preferably bears directly against the coupling unit or the bottom region. On a higher level, the first return element can thus be arranged axially between the coupling unit and the bottom region and/or axially between the second return element and the bottom region, at least in part.

One embodiment of the disclosure, starting from the piston and along the displacement axis in the direction of actuation, the pedal simulation device has the following sequence of components: Piston, second return element, coupling unit, first return element, (optional) bottom region. Elements that are adjacent to one another at least axially can also overlap axially. The bottom region can comprise the abutment region.

A development comprises that the first return element has a lower deformation resistance than the second return element. In other words, the first return element can already yield to forces of lower magnitude and/or to a greater extent than the second return element. The term "deformation resistance" can refer generally to the resilience of the return element to an otherwise suitable spring characteristic, for example an absolute and/or an average spring constant. The latter can be relevant particularly in the case of a nonlinear spring characteristic. In general, the deformation behavior of the return elements and, in particular, the differing deformation behavior thereof, that results in the above-described deformation sequences during the first and second actuation phase can be adjusted by means of the deformation resistance.

In this context, it can be provided that the described ratio of the deformation resistances is maintained at least during the first actuation phase. In other words, it can be provided that during the entire first actuation phase that the first return element retains a lower deformation resistance compared to the second return element.

The first return element can comprise different deformation portions which, in particular, can be arranged axially in succession. The deformation behavior of the deformation portions can vary from one to the other. In particular, a first deformation portion can have a deformation resistance that is reduced compared to a second deformation portion (as a result of different spring constants, for example). Upon application of deformation forces (for example, as a result of a displacement of the coupling unit), the first deformation portion may then initially undergo a greater deformation than the second deformation portion. The resetting forces generated by the first return element can thus first be determined predominantly or substantially solely by the first deformation portion. If the forces introduced exceed a threshold value at which further deformation of the first deformation portion cannot be continued or can only be slightly continued, for example, then the second deformation portion, on the other hand, can take up a larger proportion of the deformation of the first return element.

If the deformation forces are further increased, for example by continuing the displacement of the coupling unit in the direction of actuation, the resetting forces generated by the first return element can thus be made available predominantly or substantially solely by the second deformation portion.

The embodiment provides that the first return element comprises a rubber spring element. This can be substantially cylindrical and/or block-shaped. According to one variant, the rubber spring element comprises differently dimensioned and preferably axially successive sections that form different deformation portions of the first return element in the manner explained above. These sections can define a diameter step.

The rubber spring element can be arranged at least partially against or on the abutment region and/or against or on a guide region for the coupling unit that will be explained below. According to one variant, the rubber spring element comprises a borehole that preferably extends along the displacement axis. The abutment region and/or the guide region explained below can be receivable in this borehole, particularly such that the rubber spring element is held radially in position. The axial end regions of the rubber spring element can further comprise end surfaces for the purpose of being in contact or being brought into contact with the coupling unit and/or a bottom region of the housing.

Preferably, the rubber spring element assumes a substantially bias-free state when the piston is in a non-actuated state. In the non-actuated state, the piston can generally assume an initial position into which it has been forced by the return device and/or in which it is held by the return device, for example. A provision can be made that the piston leaves this initial position only upon actuation of the pedal by the driver. When this initial position is assumed, a provision can be made that at least the first return element (or also both return elements) is (or are) in a substantially bias-free state. It is only as a result of an incipient displacement of the piston in the direction of actuation, the return elements can then be placed under a (mechanical) tension.

An embodiment provides that the second return element comprises a spiral spring element. The spiral spring element can comprise or be made of a metallic material. The spiral spring element can extend concentrically around the displacement axis. The spiral spring element can abut at least partially against an inner wall of the piston, particularly if it is embodied with a hollow cylindrical receiving region. For the sake of completeness, it should be noted that the coupling unit can also abut against a housing inner wall or can be brought into contact therewith.

The abutment region can comprise an axially projecting region that may extend particularly from a bottom region of a possible lid assembly of the housing. According to one variant, the abutment region is cylindrical and/or pin-shaped, preferably with a rounded or circular cross section. The abutment region can also extend counter to the direction of actuation and/or in the direction of the piston. The abutment region can comprise an outer peripheral surface and/or an axial end region facing toward the piston. As mentioned above, the first return element can be arranged on the abutment region and, in particular, pushed onto its outer peripheral surface via a borehole and held radially thereon. The abutment region is preferably integrally formed with a housing portion.

The abutment region and the coupling unit can axially overlap one another, in which case an axial overlap length of these elements can be preferably changed—increased, for example—in accordance with a displacement of the piston in the first direction of actuation.

Additionally or alternatively, the abutment region and the coupling unit can be engaged with one another or be engageable with one another, particularly such that an axial engagement length of these elements can be changed—increased, for example—in accordance with a displacement of the piston in the first direction of actuation. The engagement can include at least one of the elements from among abutment region and coupling unit being at least partially received or receivable in the respective other element from among abutment region and coupling unit. The axial engagement length can include a length along which the abutment region and the coupling unit engage with one another.

In general, its provided that the abutment region is at least partially received or receivable in a receiving region of the coupling unit. The receiving region can be embodied as a recess, a borehole, or as a generally hollow cylindrical area. The receiving region can also be elongate and be embodied as a blind-end bore and/or extend along the displacement axis. According to one variant, the receiving region is arranged centrally within the coupling unit. The receiving region can protrude axially from a particularly plate-shaped or disc-shaped contact portion of the coupling unit. This can occur counter to the first direction of actuation and/or in the direction of the piston. In general, the receiving region can overlap axially with the second return element and/or be received therein at least partially.

The abutment region can extend into the receiving region and/or be receivable therein upon displacement of the coupling unit in the direction of actuation. This can correspond to the above-described axial overlap and/or engagement of abutment region and coupling unit. According to one variant, the receiving region is pushed onto the receiving region upon displacement in the direction of actuation. However, a provision can also be made that, when the piston is in a non-actuated initial position, the receiving region and the abutment region are already engaged and/or pushed up onto one another by a predetermined amount. Upon displacement of the coupling unit in the first direction of actuation, this amount can then be preferably increased continuously. For example, a length of a portion of the abutment region that is received in the receiving region may increase upon displacement of the coupling unit in the direction of actuation.

According to another embodiment, it may be provided that the abutment region comprises an abutment surface and the receiving region comprises a contact surface, it being possible for the contact surface to be caused to come into contact with the abutment surface upon completion of the first actuation phase. The contact surface can be a bottom and/or end face of the receiving region of the coupling unit. The abutment surface can be an end face of the abutment region facing toward the contact surface. The abutment surface can be encompassed by or form an axial end region of the abutment region. As part of a displacement of the coupling unit in the direction of actuation, an axial distance between the abutment surface and the contact surface can be decreased and, upon completion of the first actuation phase, reduced to zero. If the contact surface comes into contact with the abutment surface, further displacement of the coupling unit can be prevented as a result.

In a development, it provided that the abutment region comprises a guide region on which the coupling unit is supported, the guide region is designed to guide the coupling unit in an at least partially displaceable manner during a piston displacement during the first actuation phase. The at least partially displaceable guidance can include guidance along a predetermined displacement segment and/or along the displacement axis. Preferably, this can be more than half or even the entire possible displacement segment of the coupling unit that can be traversed in the direction of actuation as a result of a piston displacement. It may be provided that the coupling unit, at least during the first actuation phase, is guidingly supported in a substantially constant manner by the abutment region and can also be displaced relative thereto, for example by overcoming the axial gap explained at the outset.

The guide region can be provided on an outer peripheral surface of the abutment region. The coupling unit can slide down axially on the guide region. The guide region can also form and/or comprise a portion of the abutment region that overlaps axially and/or engages with the coupling unit in the aforedescribed manner. According to one variant, the guide region abuts against an inner wall of a hollow cylindrical receiving portion of the coupling unit in order to provide the guiding action.

According to one development, the pedal simulation device further comprises an intermediate coupling unit by means of which the piston is supported on the coupling unit. In other words, the intermediate coupling unit can be arranged between the piston and the coupling unit as viewed along a force flow during the piston displacement. Additionally or alternatively, the intermediate coupling unit can be arranged axially between the piston and the coupling unit at least in part. In general, the intermediate coupling unit can be displaceable along the displacement axis and particularly in the direction of actuation. This, in turn, can occur in accordance with a piston displacement. The intermediate coupling unit can also form part of the return device and/or have a shape that is complementary to the coupling unit.

A variant provides that the intermediate coupling unit comprises a region that faces toward the piston and a region that faces toward the coupling unit. Furthermore, the intermediate coupling unit can also comprise a disc-shaped and/or plate-shaped contact portion. Likewise, it can comprise a receiving region in which an additional component can be received at least partially—e.g., a receiving region of the coupling unit or an intermediate return element as explained below.

The second return element can be supported on the intermediate coupling unit at least in the event of a piston displacement that occurs in the direction of actuation and/or can come into contact therewith. The coupling unit can then be displaced, particularly in the direction of actuation and/or in the direction of the coupling unit.

Furthermore, it may be provided that the intermediate coupling unit comprises an intermediate return element that has a lower deformation resistance than the first and/or the second return element. The intermediate return element can act in series with the first and/or the second return element. In particular, the intermediate return element can be arranged in axial succession with the first and/or the second return element, at least in part. Likewise, the intermediate return element can overlap axially with at least one of the first and second return elements. According to another variant, it may be provided that the second return element is arranged axially between the first return element and the intermediate return element, at least in part. In general, the intermediate return element can further comprise a substantially linear spring characteristic and/or a spiral spring element.

Due to the lower deformation resistance—which, in turn, can be adjusted by means of a suitable spring constant—it may be provided that the intermediate return element first undergoes a significant and/or complete deformation, particularly an axial compression, during a piston displacement in the direction of actuation from its initial position. An initial actuation phase that is upstream from the first actuation phase can be defined in this way. During this initial actuation phase, a displacement of the piston can be associated predominantly or substantially solely with a deformation of the intermediate return element. On the other hand, the first and/or the second return element can be only slightly deformed or remain substantially free of deformation.

This initial actuation phase can include the movement of the piston over a predetermined displacement segment, which may particularly involve movement of the piston out of an initial position. The displacement segment during the initial actuation phase may fall below the displacement segments during the first and/or second actuation phase. In particular, during the initial actuation phase, the displacement segment may constitute no more than one tenth, no more than one quarter, or no more than half of the displacement segments during the first and/or second actuation phase.

In summary, an initial actuation phase in which the resetting forces generated by the pedal simulation device are made available predominantly or substantially solely by the intermediate return element can thus be defined by means of the intermediate return element. A progression of the simulation characteristic during this actuation phase can thus be defined substantially by the intermediate return element. Due to the lower deformation resistance, however, the initial actuation phase can be overcome in relatively quick fashion, whereupon the first actuation phase can be followed by a comparatively larger, particularly progressive resetting force. The so-called jump-in behavior of the pedal simulation device can generally be defined by means of the initial actuation phase. For example, it can be determined in this way how quickly a driver experiences clear haptic feedback after an actuation of the brake pedal. This clear haptic feedback can be provided at the latest when the first actuation phase is reached and/or when the first actuation phase has been passed through at least partially.

According to another variant, the intermediate coupling unit is arranged such that it can be brought into contact with the coupling unit and/or with the abutment region at least as a result of an actuation of the brake pedal, for example by overcoming an initial axial gap therebetween. Additionally or alternatively, the intermediate coupling unit can be arranged such that the intermediate return element is supported on the piston and/or is in contact or can be brought into contact therewith.

According to a variant, for example, it may be provided that the intermediate coupling unit is arranged close to the coupling unit and can be brought into contact with the coupling unit as a result of a piston displacement in the direction of actuation and under deformation of the intermediate return element. The intermediate return element can be arranged axially between the coupling unit and the intermediate coupling unit, at least in part. Upon completion of the initial actuation phase at the latest, the intermediate coupling unit can be supported in a substantially rigid manner on the coupling unit and/or come into contact therewith.

According to another variant, it may be provided that the intermediate coupling unit is arranged axially between the second return element and a surface of the piston facing toward the second return element, at least in part. This surface can be a bottom surface of a hollow cylindrical portion of the piston. In this context, the intermediate return element may extend at least partially between the corresponding surface of the piston and a contact portion of the intermediate coupling unit. The second return element can be supported on or abut against a side of the contact portion facing away from the intermediate return element. Upon completion of the initial actuation phase at the latest, the intermediate coupling unit can be supported in a substantially rigid manner on the piston and/or come into contact therewith.

Particularly in the latter-mentioned variant, in which the intermediate coupling unit is arranged dose to the piston and optionally comes into contact therewith, a provision can also be made that the intermediate coupling unit is designed to bear against the abutment region in such a way that further displacement of the intermediate coupling unit in the direction of actuation is prevented. This can occur particularly after the initial actuation phase and, optionally, at least part of the first or the second actuation phase has been completed.

In this context, the abutment region can comprise a secondary abutment region that is designed to interact with the intermediate coupling unit and, in particular, to come into contact therewith. The secondary abutment region can extend axially from the abutment region and, in particular, from an abutment surface that interacts with the coupling unit in the direction of the piston. In other words, the secondary abutment region can protrude axially in the direction of the piston via the abutment surface interacting with the coupling unit. In doing so, it can extend substantially along the displacement axis and also absorb it at least in part. According to a variant, the secondary abutment region comprises a bolt that is optionally fastened to the abutment surface that changes with the coupling unit, for example by means of a screw connection.

The intermediate coupling unit can further comprise a region with which it can be brought into contact with the secondary abutment region. This region can comprise a damping element, for example a rubber-elastically deformable element. The intermediate coupling unit and the secondary abutment region can be spaced apart from one another by a defined axial distance when the pedal simulation device is in an initial position or, to put it another way, they can be spaced apart from one another by a defined axial gab. The size of this distance determines the point in time (and the displacement path of the piston) from which the abutment between the contact region and the secondary abutment region can be established. According to a variant, this abutment takes place only after completion of the first actuation phase and preferably also after at least partial completion of the second actuation phase. In particular, a provision can be made that this abutment is established only upon conclusion of an operation of the pedal simulation device in which the second return element has already been defined by a predetermined amount. If the damping element is additionally provided, the suggestion of a damped conclusion of the braking process can be given to the driver.

Finally, it should be noted that the disclosure can also provide a pedal simulation device according to the above variants in which the first and second return elements have any desired spring characteristics. In other words, a pedal simulation device is also provided according to the present disclosure which comprises: a housing; an abutment region that is coupled with the housing in a substantially rigid manner; a piston that is received in the housing and can be moved in a direction of actuation by passing through successive first and second actuation phases; a return device that is configured to exert a resetting force on the piston that acts counter to the displacement of the piston in the direction of actuation; the return device comprising: a first elastically deformable return element, a second elastically deformable return element, and a coupling unit, wherein the first and second return elements are configured so as to abut against one another at least as a result of an actuation of the brake pedal via the coupling unit, wherein the coupling unit can be displaced during the first actuation phase of the piston under deformation of predominantly or substantially solely the first return element, wherein the coupling unit is designed to abut against the abutment region upon completion of the first actuation phase in such a way that further displacement in the direction of actuation is prevented, and wherein the piston is configured so as to be displaced further in the direction of actuation when passing through the second actuation phase under deformation of predominantly or substantially solely the second return element. It will readily be understood that this additional variant can be combined with all aspects and developments of the pedal simulation device that are explained above and below.

The disclosure further relates to an automotive brake system comprising a pedal simulation device according to any one of the aspects explained above or below. In particular, a provision can be made in this case that the automotive brake systems comprise a brake pedal that is hydraulically coupled with the pedal simulation device.

The disclosure further relates to a method for providing haptic feedback during actuation of the brake pedal, particularly using a pedal simulation device according to any one of the preceding or following aspects. The method comprises the following steps:

a) D Displacing a piston in a direction of actuation with predominant or substantially solely deformation of a first elastically deformable return element;

b) displacing a coupling unit in the direction of actuation in accordance with the piston displacement;

c) after a predetermined displacement segment has been traversed, establishing a supporting interaction between the coupling unit and an abutment region in such a way that further displacement of the coupling unit in the direction of actuation is prevented; and, subsequently, d) further displacing a piston in the direction of actuation with predominant or substantially solely deformation of a second elastically deformable return element.

According to a preferred variant, it may be provided that the first return element has a substantially nonlinear spring characteristic and the second return element has a substantially linear spring characteristic. Steps a) and b) can be carried out at least partially in parallel. The displacement segment in step c) can refer to a displacement segment of the piston and/or of the coupling unit, particularly from an initial position of the piston and/or of the coupling unit and preferably along the displacement axis. The supporting interaction can include causing the coupling unit and abutment region to come into contact. In step d), further elastic deformation of the first return element can then be prevented. It will readily be understood that steps a) and b) can constitute the above-described first actuation phase. Step d), on the other hand, can define the second operating phase explained above.

In general, the method can comprise any additional steps or features for achieving all of the effects and/or interactions discussed above or below. In particular, an initial actuation phase can be additionally provided in which an intermediate coupling unit is displaced and/or an intermediate return element is deformed in the manner explained above. Likewise, the method can comprise a step of hydraulically coupling a brake pedal with a pedal simulation device by means of which steps a)-d) are carried out. Additionally or alternatively, a step of introducing a volume of hydraulic fluid that has been displaced in accordance with an actuation of the brake pedal can be provided in a pressure chamber that is delimited by the piston. Furthermore, a step of the hydraulic uncoupling of the brake pedal from the wheel brakes of an automotive brake system can be provided.

Finally, the disclosure relates to a pedal simulation device that is designed to carry out a method of the aforementioned type.

BRIEF DESCRIPTION OF THE FIGURES

Additional advantages, details, and features of the solution described herein will be apparent from the following description of exemplary embodiments and from the figures. In the drawing:

FIG. 7 shows a damping element of the fourth exemplary embodiment shown in FIG. 6; and FIG. 8 shows a return element of the four exemplary embodiment shown in FIG. 6.

DETAILED DESCRIPTION

Figure 1:
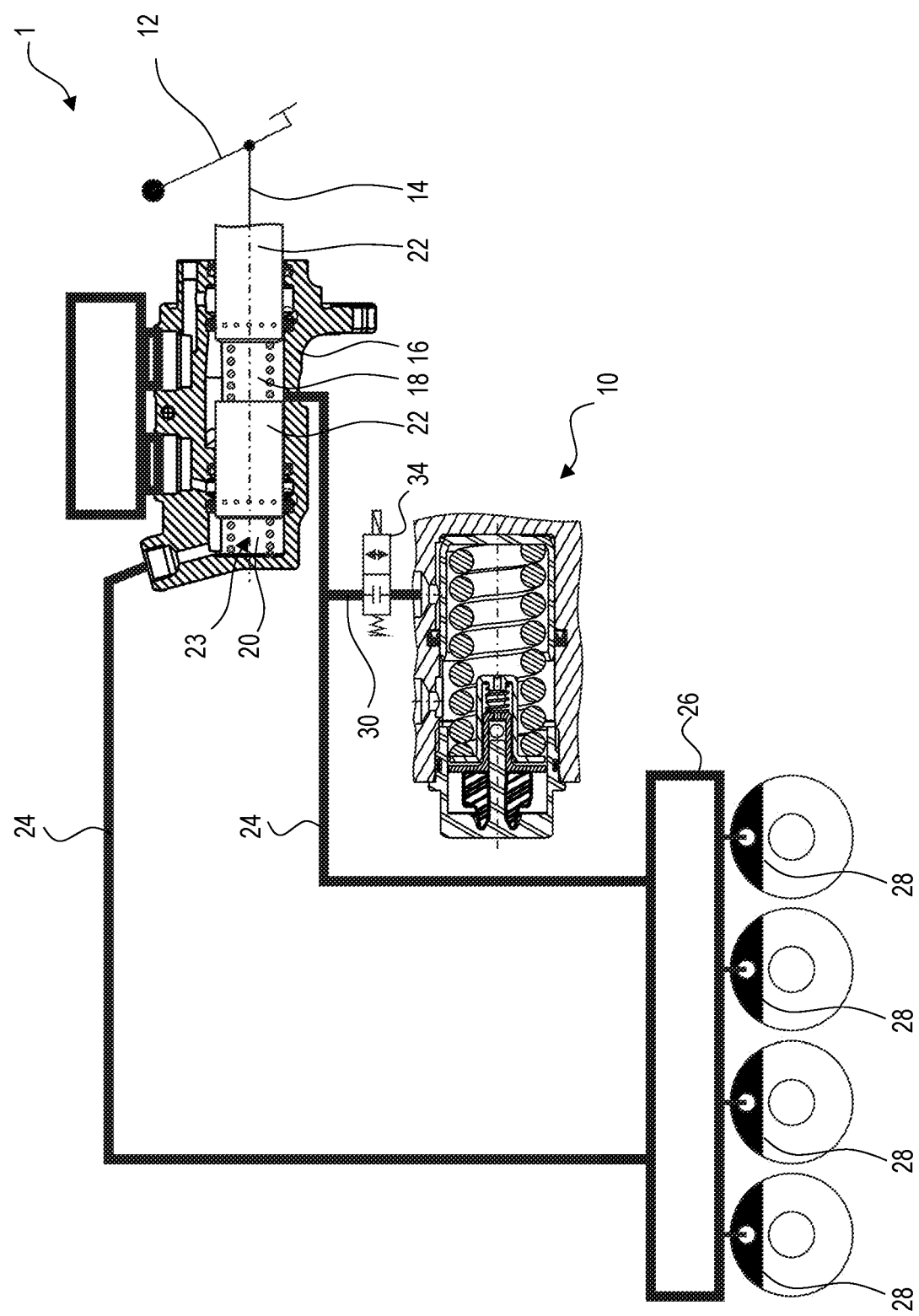
FIG. 1 shows a schematic overall view of an automotive brake system comprising a pedal simulation device according to an exemplary embodiment.

FIG. 1 shows a schematic overall view of an automotive brake system 1 comprising a pedal simulation device 10 according to a exemplary embodiment. More specifically, the pedal simulation device 10 is the second exemplary embodiment explained below. It will readily be understood, however, that any pedal simulation device 10 according to the first to third exemplary embodiments can be used in the automotive brake system 1 of FIG. 1.

The automotive brake system 1 is constructed according to generally known principles and will therefore be explained only briefly. On the other hand, the present disclosure is aimed substantially at the construction and the mode of operation of the pedal simulation device 10.

The automotive brake system 1 comprises a driver-actuated brake pedal 12. This is coupled via the power input member 14 with a brake master cylinder 16. The brake master cylinder 16 comprises a first pressure chamber 18 and a second pressure chamber 20. The pressure chambers 18, 20 are delimited by a respective brake piston 22 that can be displaced in a cylinder bore 23 of the master cylinder 16 in accordance with an actuation of the brake pedal. Specifically, the pistons 22 are displaced to the left in FIG. 1 during actuation of the brake pedal, so that the volume of the respective pressure chambers 18, 20 decreases. A hydraulic pressure is then built up which acts via the lines 24 on a valve assembly 26 (shown schematically). In a known manner, the lines 24 are each associated with one of the pressure chambers 18, 20 in order to supply two fluidically uncoupled brake circuits of the automotive brake system 1 with hydraulic pressure.

The valve assembly 26 can be embodied as a conventional valve assembly of a slip control system. The valve assembly 26 is connected upstream from the wheel brakes 28 (shown schematically) and can couple these individually or in pairs hydraulically with one of the lines 24. The hydraulic pressure generated by the driver can thus act on the wheel brakes 28 and generate braking forces there in the usual manner. In the present case, however, the automotive brake system 1 is constructed according to a so-called "brake-by-wire" principle. Accordingly, it may be provided that, at least during normal operation, a hydraulic pressure generated by the driver does not act directly on the wheel brakes 28. Instead, an actuation of the brake pedal is sensed and transmitted to a pressure-generating unit (not shown) that is comprised by the valve assembly 26. Depending on the extent of the brake pedal actuation (e.g., the actuation path and/or the actuation speed of the brake pedal 12), the pressure-generating device of the valve assembly 26 generates corresponding brake pressures on the wheel brakes 28.

In order to still be able to give the driver haptic feedback about the braking process nevertheless, the pedal simulation device 10 is provided, which is hydraulically coupled with one of the lines 24. This hydraulic coupling is achieved by means of a branch 30 that leads from one of the lines 24 to an inlet opening 32 of the pedal simulation device 10. A switching valve 34 is further provided in the branch 30 that can be preferably actuated by electromechanical means. In the regular "brake-by-wire" mode, in which no direct hydraulic coupling of the brake pedal 12 and the wheel brakes 28 is provided, this switching valve 34 assumes an open state. Consequently, the hydraulic fluid transported via the corresponding line 24 is introduced primarily into the pedal simulation device 10. In the manner explained below, the pedal simulation device 10 can then generate resetting forces that are suggestive of an actual interaction with the wheel brakes 28 for the driver 12.

Figure 2:
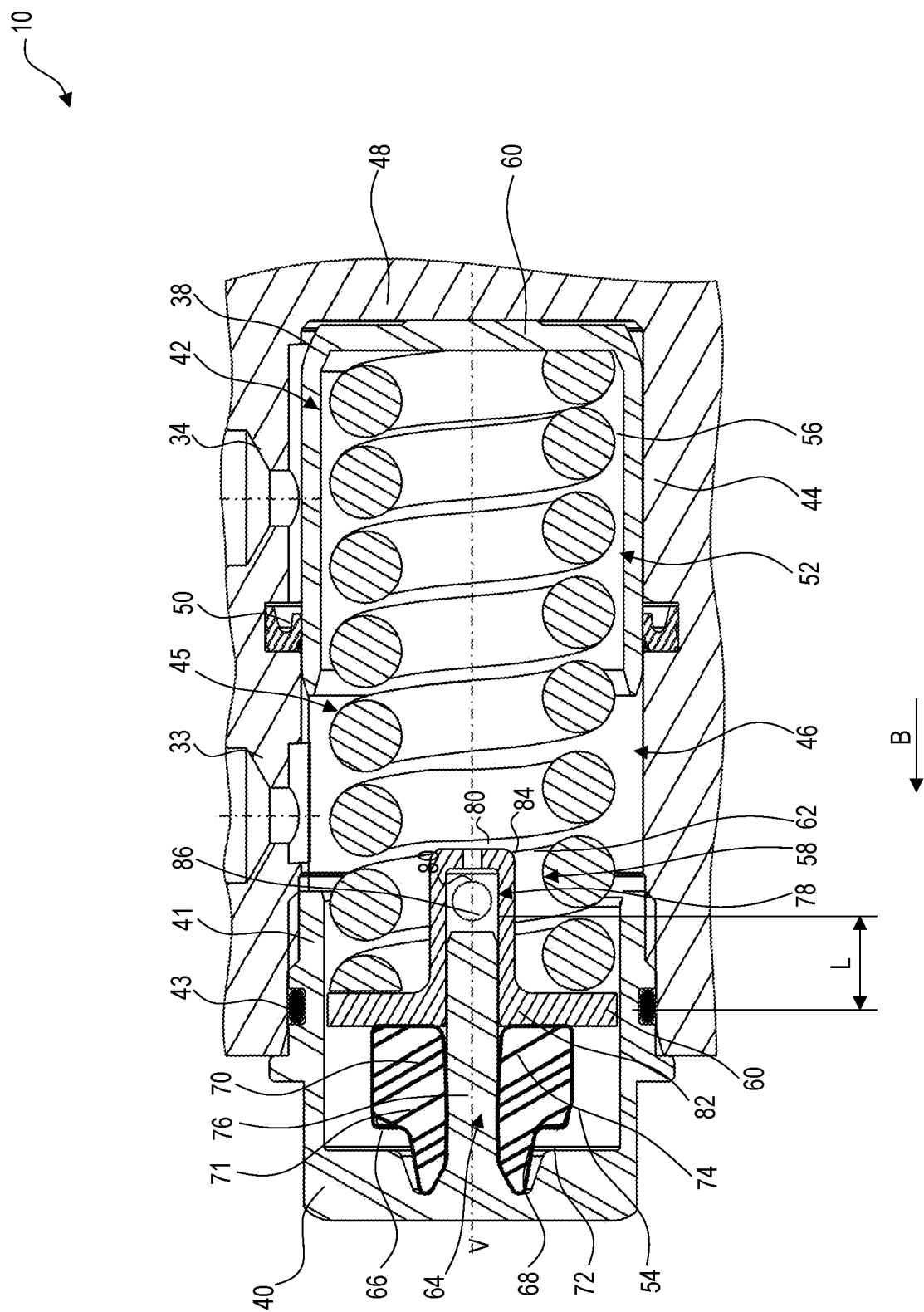
FIG. 2 shows a pedal simulation device according to a first exemplary embodiment in a sectional view containing the displacement axis.

FIG. 2 shows a pedal simulation device 10 according to a first exemplary embodiment. It can be seen that the pedal simulation device 10 comprises a housing 36 in which the above-described inlet opening 32 is designed to enable hydraulic coupling with the brake pedal 12. The housing 36 comprises a hollow cylindrical recess 38 (or cylinder bore) that extends substantially concentrically around the displacement axis V explained below. The hollow cylindrical recess 38 is closed and, in particular, fluidly sealed to the outside by means of a lid assembly 40 that is inserted into the recess 38. More specifically, the hollow cylindrical recess 38 and the lid assembly 40 define a closed cavity of the housing 36. This is subdivided into a pressure chamber 42 and a receiving space 45 for a return device 46 explained below. The pressure chamber 42 is delimited by a bottom surface 48 (or, in other words, by a bottom region 48) of the hollow cylindrical recess 38. The bottom surface 48 forms a first axial end region of the hollow cylindrical recess 38, whereas the lid assembly 40 forms a second axial end region of the cavity that is delimited by the housing 36 opposite the bottom surface 48.

The pressure chamber 42 is further delimited by a piston 44 that is displaceably received in the hollow cylindrical recess 38. The piston 44 is likewise hollow and cylindrical and extends concentrically around the displacement axis V. In the initial position of the pedal simulation device 10 shown in FIG. 2, in which no brake pedal actuation has taken place and no fluid has been introduced via the inlet opening 32, the piston 44 rests against the bottom surface 48 of the pressure chamber 42. Furthermore, it can be seen in FIG. 2 that the piston 44 abuts with its outer peripheral surface against a seal assembly 50 in order to fluidically seal the pressure chamber 42.

As mentioned, the piston 44 is hollow and cylindrical and comprises a cylinder bore 52 that extends concentrically with respect to and along the displacement axis V. Together with the lid assembly 40, the cylinder bore 52 delimits the receiving space 45 for the return device 46. The return device 46 comprises a first return element 54, which is embodied as a rubber spring element, and a second return element 56, which is embodied as a metallic spiral spring. These are separated spatially from one another by a coupling unit 58, particularly in such a way that the return elements 54, 56 do not contact one another directly. However, both return elements 54, 56 are supported on the coupling unit 58 and are thus connected in a force-conducting manner. Overall, the return elements 54, 56 are arranged in series along the displacement axis V and can be deformed substantially in succession in the manner explained below.

A first axial end of the second return element 56 is received in the cylinder bore 52 of the piston 44 and abuts against a bottom wall 60 thereof. A second axial end, however, which faces toward the lid assembly 40, faces toward the coupling unit 58 and abuts against it. Specifically, the coupling unit 58 comprises a contact portion 60 that is plate-shaped or disc-shaped and receives the displacement axis V centrally. The contact portion 60 thus forms a plate-shaped and, in the case shown, round element that extends substantially radially to the displacement axis V. Furthermore, the coupling unit 58 comprises a receiving portion 62, explained below, which interacts with an abutment region 64 of the lid assembly 40.

The contact portion 60 comprises a first side which faces toward the second return element 56 and abuts against same. A side the contact portion 60 facing away from this faces toward a bottom surface 66 of the lid assembly 40, this bottom surface 66 being situated opposite the bottom surface 48 of the hollow cylindrical recess 38. The first return element 54 is received in the axial interspace that is delimited by the bottom surface 66 and the contact portion 60. This abuts against both the contact portion 60 and the bottom surface 66.

In the depicted exemplary embodiment, the first return element 54 is generally embodied so as to have a lower deformation resistance than the second return element 56. In other words, the first return element 54 is embodied as a soft spring element compared to the second return element 56, whereas the second return element 56 is embodied as a hard spring element by comparison. The first return element 54 further comprises two deformation portions 68, 70 which, in turn, have different deformation resistances. In concrete terms, a first deformation portion 68 that faces directly toward the bottom surface 66 and is in engagement therewith is provided which has a comparatively low deformation resistance, meaning that it is embodied as a soft spring portion. The first deformation portion 68 is also partially received in a recess 72 in the bottom surface 66. It can be seen that there is an interference fit, and the recess 72 still provides sufficient clearance in the initial position shown to accommodate the deformation portion 68 and, in particular, a radial outward force resulting from a deformation.

The second deformation portion 70 has a higher deformation resistance and a larger diameter compared to the first deformation portion 68. Furthermore, it forms a harder spring portion as compared to the first deformation portion 68. In the initial position shown, it is also spaced apart axially from the bottom surface 66. Overall, the deformation resistances of the deformation portions 68, 70 are selected such that the above-described ratio of the deformation resistances between the first and second return elements 54, 56 is achieved.

Also visible in FIG. 2 is the previously mentioned abutment region 64, which extends radially in the center from the bottom surface 66 along the displacement axis V in the direction of the piston 44. The abutment region 64 is embodied as a cylindrical, pin-like, and protruding region having a rounded cross section. An outer peripheral surface of the abutment region 64 defines a guide region 74. It can be seen that the first return element 54 has a central borehole 76 with which it is pushed up onto the guide region 74. The guide region 74 thus secures a radial position of the first return element 54. Furthermore, it can be seen that the coupling unit 58 is also arranged on the guide region 74 and, more precisely, is pushed over same via the receiving region 62.

In detail, the receiving region 62 is formed radially in the middle of the coupling unit 58 and defines a hollow cylindrical region that extends substantially axially along the displacement axis V. Specifically, the receiving region 62 extends in the direction of the piston 44 and receives the displacement axis V centrally. The receiving region 62 comprises a recess in the form of a receiving bore 78 that likewise extends along the displacement axis V. This is open in the direction of the first return element 54. Furthermore, it comprises comparatively small-dimensioned vent holes 80. Moreover, the receiving region 62 comprises a receiving opening 82 that faces toward the first return element 54 and in which the abutment region 64 is already partially received in the initial position shown in FIG. 2. More specifically, the abutment region 64 and the coupling unit 58 are already engaged with one another in the non-actuated initial position of the pedal simulation device 10 and thus have an axial overlap and/or engagement length L. A portion of the guide region 74 of the abutment region 64 abuts against an inner peripheral wall of the receiving bore 78 of the receiving portion 62 via the engagement length L.

However, a relative displacement of coupling unit 58 and abutment region 64—and, concretely, a sliding of the coupling unit 58 along the guide region 74 in the direction of the bottom surface 66—is still possible in this state. This is due to the fact that, in the initial position, a contact surface 84 that forms an axial bottom surface of the receiving bore 78 is still arranged at an axial distance from an abutment surface 86 of the abutment region 64. To put it another way, in the initial position shown, the coupling unit 58 is initially arranged on the abutment region 64 with axial gap. As will be elucidated below, however, this axial gap between the abutment surface 86 and the contact surface 84 can be overcome upon actuation of the pedal simulation direction 10, so that the corresponding surfaces 84, 86 can be brought into abutment with one another. This creates a supporting interaction between the coupling unit 58 and the abutment region 64 which is such that further relative displacement of the lid assembly 40 in the direction of the bottom surface 66 is prevented.

In the following, a mode of operation of the pedal simulation device 10 will be explained. During actuation of the brake pedal, the introduction of a hydraulic fluid via the inlet opening 32 results in a build-up of hydraulic pressure in the pressure chamber 42. The piston 44 then moves along the displacement axis V (to the left in FIG. 2), thereby increasing the volume of the pressure chamber 42 at the expense of the volume of the receiving space 45. This corresponds to a movement in a direction of actuation B. Due to the different deformation resistances or, in other words, spring constants of the return elements 54, 56, this is accompanied by different deformations of the return elements 54, 56. Specifically, the piston 44 is supported on the coupling unit 58 via the second return element 56 during a first actuation phase in which it is displaced from its initial position shown in FIG. 2 in the direction of actuation B. The coupling unit 58, in turn, is supported on the second return element 54 on the bottom surface 66 of the lid assembly 40. Within this power flow, the first return element 54 has the lowest deformation resistance and thus undergoes the greatest deformation. At first, this involves the first deformation portion 68, which has the lowest deformation resistance and is thus axially compressed under pronounced elastic deformation. As a result, it undergoes a radial expansion and is pushed farther into the recess 72 in the bottom surface 66. At the same time, the initial axial distance between the second deformation portion 70 and the bottom surface 66 shown in FIG. 2 is overcome, so that an end surface 71 of this deformation portion 70 facing toward the bottom surface 66 comes into contact with the bottom surface 66.

At this point in time, the first deformation portion 68 has already undergone significant deformation and, due to the spatial limitation through the recess 72, can now only be deformed slightly further. If the piston 44 is further displaced in the direction of actuation B, which is accompanied by a further displacement of the coupling unit 58 in the direction of actuation B, then the second deformation portion 70 of the first return element 54 is deformed and, more precisely, compressed axially. Due to the substantially greater deformation resistance of the second return element 56, however, the latter undergoes only negligible axial compression at this time.

The deformation of the first return element 54 is continued until the axial gap between the abutment region 64 and the coupling unit 58 has been overcome and the abutment surface 86 comes into abutment with the contact surface 84. In this case, a deformation state of the first return element 54 is maintained, and further displacement of the coupling unit 58 in the operating direction B is prevented. In detail, the coupling unit 58 is supported in this state on the abutment region 64 in such a way that it is coupled with the lid assembly 40 in a mechanically rigid manner. It should be emphasized that the lid assembly 40 itself forms part of the housing 36 of the pedal simulation device 10 and is connected in a mechanically rigid manner to a main housing portion 43 of the housing by means of a threaded connection 41. The abutment region 64 thus provides a mechanically fixed or, in other words, mechanically rigid abutment, particularly via its abutment surface 86.

It is during this first actuation phase, which is characterized by an overcoming of the axial gap between coupling unit 58 and abutment region 64, that substantially the first return element 54 is deformed. This also takes place in the form of the above-described sequence of a deformation of the first before the second deformation portion 68, 70. The resetting forces provided by the pedal simulation device as a whole, which are also referred to as a counterforce reaction, have a nonlinear progression due to the rubber-elastic property of the first return element 54. The pedal simulation device 10 is generally characterized by a simulation characteristic that demonstrates the progression of the generated resetting forces via the displacement path of the piston 44 and/or of a brake pedal actuation path (or also of a so-called "pedal stroke"). During the first actuation phase, in which it is predominantly the first return element 54 that is deformed, this simulation characteristic therefore also has a nonlinear progression. Due to the low deformation resistance of the first return element 54, the course of the simulation characteristic in this region is comparatively flat and haptic feedback to the driver is moderate. In addition, the first deformation portion 68, which is deformed first, provides an especially low initial deformation resistance that is quickly overcome. This is followed by an augmented but comparatively gentle increase in the resetting forces generated as a result of a deformation of the second deformation portion 70.

It is thus possible to use the first deformation portion 68 to adjust the so-called jump-in behavior, by means of which it is determined how quickly the driver receives significant haptic feedback. The deformation of the first deformation portion 68 can therefore also be described as an initial actuation phase that precedes the actual first actuation phase of the pedal simulation device 10. In this case, the first actuation phase would thus be distinguished by a predominant deformation of the second deformation portion 70. The pedal operation detected in this phase can also be converted into a correspondingly rapid generation of actual braking forces by means of the pressure-generating device of the valve assembly 26 from FIG. 1. Compared to the embodiments described below, this one differs in that the initial actuation phase and the first actuation phase are essentially defined by the same return element 54, which, however, is subdivided into different deformation portions 68, 70. Such a subdivision of the return element 54 is purely optional, however.

As described, the deformation of the first return element 54 is substantially completed once abutment surface 86 and contact surface 84 have been brought into contact. If the piston 44 is then displaced further in the direction of actuation B, the second actuation phase begins, in which it is predominantly or almost solely the second return element 56 that is deformed. In this case, the coupling unit 58 forms a mechanically rigid abutment due to the supporting interaction with the abutment region 64. The second return element 56 is thus axially compressed in accordance with a piston displacement. Since the second return element 56 is embodied as a metallic spiral spring, it has a substantially linear spring characteristic. Accordingly, the simulation characteristic of the pedal simulation device 10 is also characterized by a linear progression during this second actuation phase. Since the second return element 56 also has a substantially greater deformation resistance than the first return element 54, overall greater resetting forces are generated during this second actuation phase, and the driver receives substantially more noticeable haptic feedback.

During the piston displacement described above, air can escape from the receiving space 45 via an outlet opening 33. Once the piston displacement has been completed, the elastic return elements 54, 56 can push the piston 44 back into its initial position shown in FIG. 2, whereby the return elements 54, 56 relax and return to their original shape.

An advantage of the exemplary embodiment shown consists firstly in the fact that especially precise and clearly delimitable regions of the simulation characteristic can be defined. This is achieved by virtue of the fact that the serially acting first and second return elements 54, 56 can be deformed to different degrees in the various actuation phases, whereby their influences on the simulation characteristic can be precisely defined. An individual simulation characteristic can thus be set by suitably dimensioning the return elements 54, 56 as a function of the requirements of a specific vehicle model. According to the present exemplary embodiment, further, the nonlinear spring characteristic is also provided initially through deformation of the first return element 54, which increases progressively and comparatively smoothly in order to initially give the driver only slight haptic feedback and suggest smooth brake operation. Only then are the resetting forces provided substantially by the second return element 56, which generates clearly perceptible and, above all, linearly increasing haptic feedback. A direct interaction and, in particular, continuous increase in brake actuation is thus suggested. Such a definition of the simulation characteristic imparts an especially natural pedal sensation to the driver. Furthermore, by virtue of its mechanically rigid support on the abutment region 64, the coupling unit 58 enables an especially precise subdivision of the simulation characteristic that can be maintained over a long period of operation. What is more, the first return element 54 is thereby protected from excessive deformation.

Figure 3:
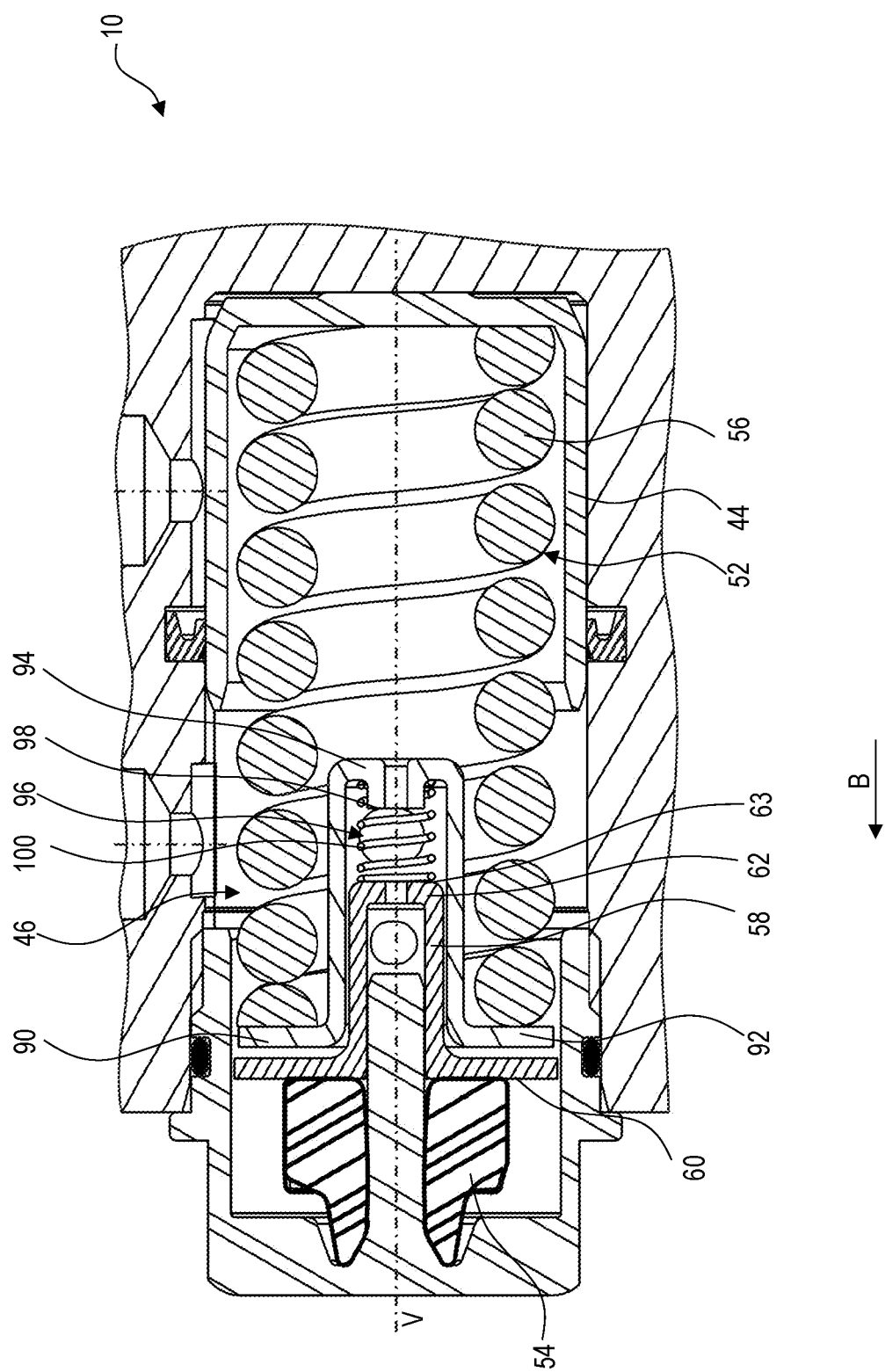
FIG. 3 shows a pedal simulation device according to a second exemplary embodiment in a sectional view containing the displacement axis.
Figure 4:
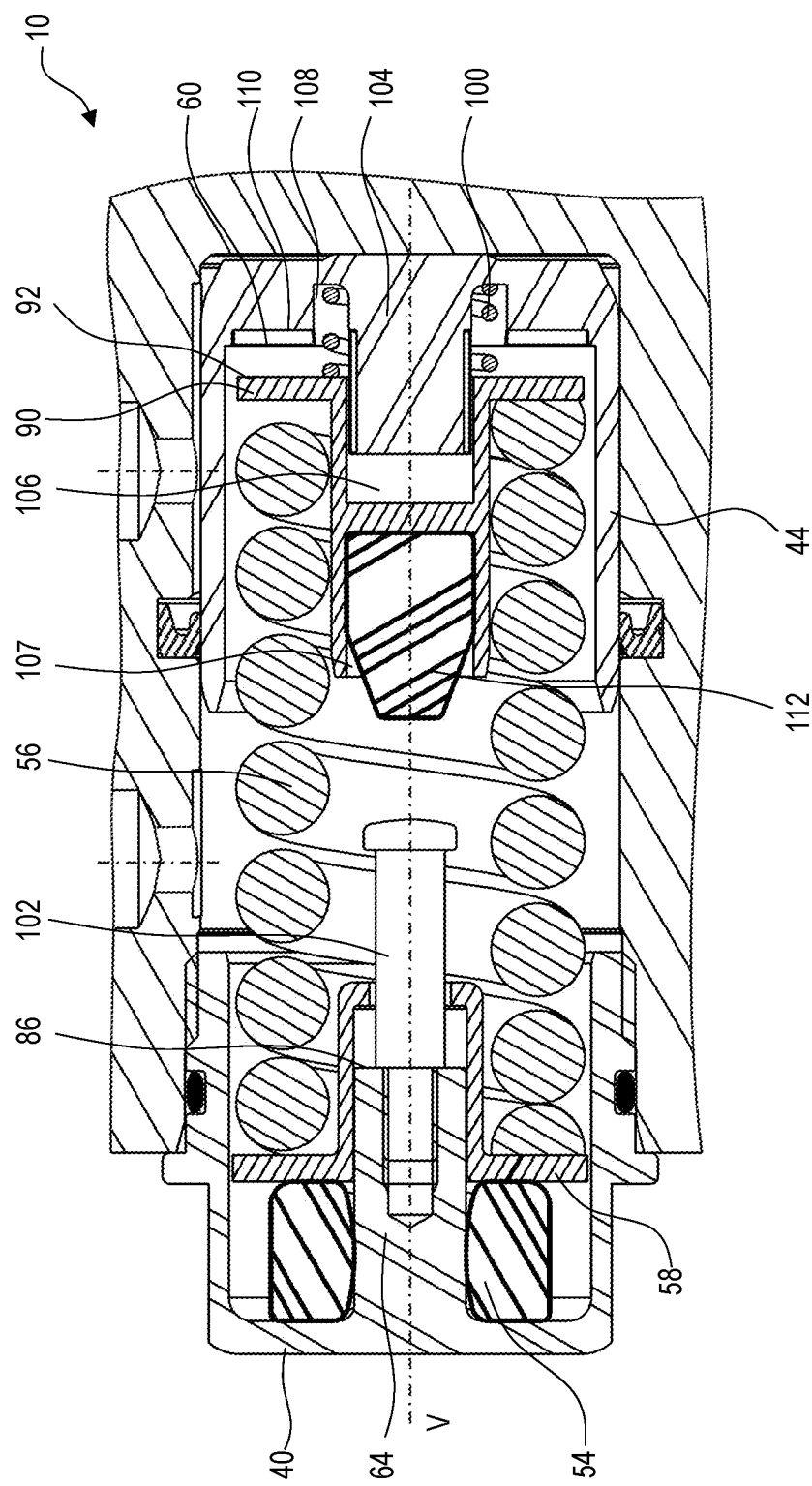
FIG. 4 shows a pedal simulation device according to a third exemplary embodiment in a sectional view containing the displacement axis.

FIGS. 3 and 4 explain additional exemplary embodiments of a pedal simulation device 10. Essentially only those components which differ from the first embodiment according to FIG. 2 will be described again here. In addition, features that are similar or have a similar effect are provided with the same reference numerals.

FIG. 3 shows a second embodiment that is based on an identical basic structure as the exemplary embodiment according to FIG. 2. In this case, however, the return device 46 comprises an additional intermediate coupling unit 90 in order to be able to set an initial actuation phase and the so-called jump-in behavior explained above in an especially precise manner. Analogously to the coupling unit 58, the intermediate coupling unit 90 is embodied with a radially extending disc-shaped contact portion 92 and a hollow cylindrical receiving portion 94 projecting axially therefrom in the direction of the piston 44. The hollow cylindrical receiving region 94, in turn, defines a receiving bore 96. The receiving region 62 of the coupling unit 58 is received partially herein. In other words, the intermediate coupling unit 90 is pushed up onto the receiving region 62 by a predetermined amount. The contact portion 92 of the intermediate coupling unit 90 is also facing toward the contact portion 60 of the coupling unit 58. In the non-actuated initial position of the pedal simulation device 10 shown in FIG. 3, axial gap is provided between these elements. The second return element 56 is supported on a side of the contact portion 92 of the intermediate coupling unit 90 facing away from the contact portion 60 of the coupling unit 58. The second return element 56 is thus arranged at least partially between the intermediate coupling unit 90 and the piston 44.

If the piston 44 is moved in the direction of actuation B in the manner explained above, the second return element 56 thus forces the intermediate coupling unit 90 in the direction of the coupling unit 58.

It can also be seen in FIG. 3 that an axial clearance initially exists between a bottom region of the cylinder bore 98 and an outer end surface 63 of the receiving region 62. Furthermore, an intermediate return element 100 in the form of a metallic spiral spring is received between the outer end surface 63 and the bottom region 68. This has a lower deformation resistance than all of the other return elements 54, 56, including the different deformation portions 68, 70 of the first return element 54.

During operation of the pedal simulation device 10, this means that the piston 44, upon displacement from an initial position in the direction of actuation B, initially also moves the intermediate coupling unit 90 in the direction of actuation B and relative to the coupling unit 58 under deformation of the intermediate return element 100. Due to their substantially higher deformation resistance compared to the intermediate return element 100, the other return elements 54, 56 are deformed only slightly or almost not at all. In this so-called initial actuation phase, the resetting forces of the pedal simulation device are determined substantially by the intermediate return element 100. The same applies to a first portion of the resulting simulation curve, which shows a rapid linear increase. As soon as the axial clearance between the contact portion 92 of the intermediate coupling unit 90 and the contact portion 60 of the coupling unit 58 has been overcome, the piston 44 is supported on the coupling unit 58 directly and axially in a backlash-free manner. Then begins the first actuation phase, in which it is substantially the first return element 54 that is deformed, followed by the second actuation phase, which is associated substantially with a deformation of the second return element 56. The corresponding processes and the resetting forces generated in the process correspond to those as explained with reference to FIG. 2.

The intermediate return element 100 can also provide the advantage of compensating for component tolerances or temperature-related dimensional changes, particularly of the first return element 54. To wit, in the case shown, these factors primarily influence the axial distance between coupling unit 58 and intermediate coupling unit 92, which can only have a small influence on the simulation characteristic. Furthermore, the intermediate return element 100 can exert a bias on the first return element 54, particularly in such a way that the deformation portion 68 can be held reliably in the recess 72, whereby its wear can be reduced (see FIG. 2).

It should be emphasized that the formation of the first return element 54 with different deformation distances 68, 70 in both exemplary embodiments of FIGS. 2 and 3 is purely optional, and that it is also possible for only one deformation portion 68, 70, particularly only the second deformation portion 70, to be provided. In that case, the first return element 54 would then have a substantially block-shaped configuration, for example, and the recess 72 in the bottom surface 66 of the lid assembly 40 could be dispensed with (see FIG. 2).

FIG. 4 shows a third exemplary embodiment that is based on the principle of the second exemplary embodiment according to FIG. 3 but provides a different shape and arrangement of the intermediate coupling unit 90. In detail, it can be seen that the first return element 54 is block-shaped and thus embodied with only one deformation portion. Furthermore, the abutment region 64 has a secondary abutment region 102 that extends in the direction of the piston 44 starting from the abutment surface 86, which interacts in the usual manner with the coupling unit 58. The secondary abutment region 102 is formed by a bolt that is screwed into the abutment region 64 that extends along the displacement axis V and is received concentrically in the second return element 56. The intermediate coupling unit 90, however, is received in the hollow cylindrical recess 52 of the piston 44. In the process, the intermediate coupling unit 90 receives a guide projection 104 of the piston that extends from the bottom surface 60 of the piston 44 in the direction of the lid assembly 40, in a central recess 106. The coupling unit 90 is displaceably guided on the guide projection along the displacement axis V.

In the initial position shown in FIG. 4, the intermediate coupling unit 90 and, in particular, a contact portion 92 thereof is initially arranged at an axial distance from—or, in other words, with an axial clearance relative to—the bottom surface 60 of the piston 44. Furthermore, an intermediate return element 100 is again arranged between the contact portion 92 and the bottom surface 60 that receives the guide projection 104 concentrically. The bottom surface 60 has a stepped progression comprising a recess 108 that receives the guide projection 104 and the intermediate return element 100. Furthermore, the bottom surface 60 has a contact region 110 which, in turn, comprises a stepped recess in order to be able to receive the contact portion 92 of the intermediate coupling unit 90. Finally, at its axial end facing toward the abutment region 64, the intermediate coupling unit 90 has a damping element 112 that is made of a rubber material.

During operation, the piston 44 is displaced from its initial position shown in FIG. 4 in the direction of actuation B in a manner analogous to that described above. The intermediate return element 100 is again embodied with the lowest deformation resistance of all of the return elements 100, 54, 56 and is thus initially deformed or predominantly almost solely during an initial actuation phase. It thus again defines the jump-in behavior as well as the initial resetting forces of the pedal simulation device 10 and the initial progression of its simulation characteristic. In overcoming the initial axial clearance between the intermediate coupling unit 90 and the bottom surface 60 of the piston 44, the intermediate return element 100 is deformed by a predetermined distance until the contact portion 60 and the abutment region 110 of the piston 44 are brought into mechanically rigid abutment. Further deformation of the intermediate return element 100 is thus prevented.

Upon further displacement of the piston 44 in the direction of actuation B, the first actuation phase begins. It is substantially the first return element 54 that is deformed in the above-described manner, resulting in a nonlinear, progressive simulation characteristic having a comparatively gentle rise. In the manner explained above, the deformation of the first return element 54 is limited by the mechanically rigid abutment of the coupling unit 58 against the abutment region 64. This is followed by an solely deformation of the second return element 56, whereupon a linear simulation characteristic is established with a comparatively steep rise.

A defined abutment against the secondary abutment region 102 can also be set by means of the damping element 112 that is received in a central blind-end bore 107 of the intermediate coupling unit 90. The timing of this abutment can be adjusted via the initial distance shown in FIG. 4 between the secondary abutment region 92 and an end surface of the damping element 112. In particular, this can be an abutment that is conclusively damped, which limits the displacement of the piston 44 upward in the direction of movement B. In other words, a provision can be made that the abutment between the secondary abutment region 102 and the damping element 112 is produced only after maximum deformation of the intermediate return element 100 and the first return element 54 and significant deformation of the second return element 56. Accordingly, this concerns an end region of the simulation characteristic that suggests the achievement of maximum brake actuation to the driver.

It should be noted that the provision of the secondary abutment region 102 and the damping element 112 is purely optional, and that the embodiment according to FIG. 4 can also be implemented without these elements. However, the optional addition of these features offers the advantage that a defined and, above all, damped completion of the braking process is suggested to the driver toward the end.

Figure 5:
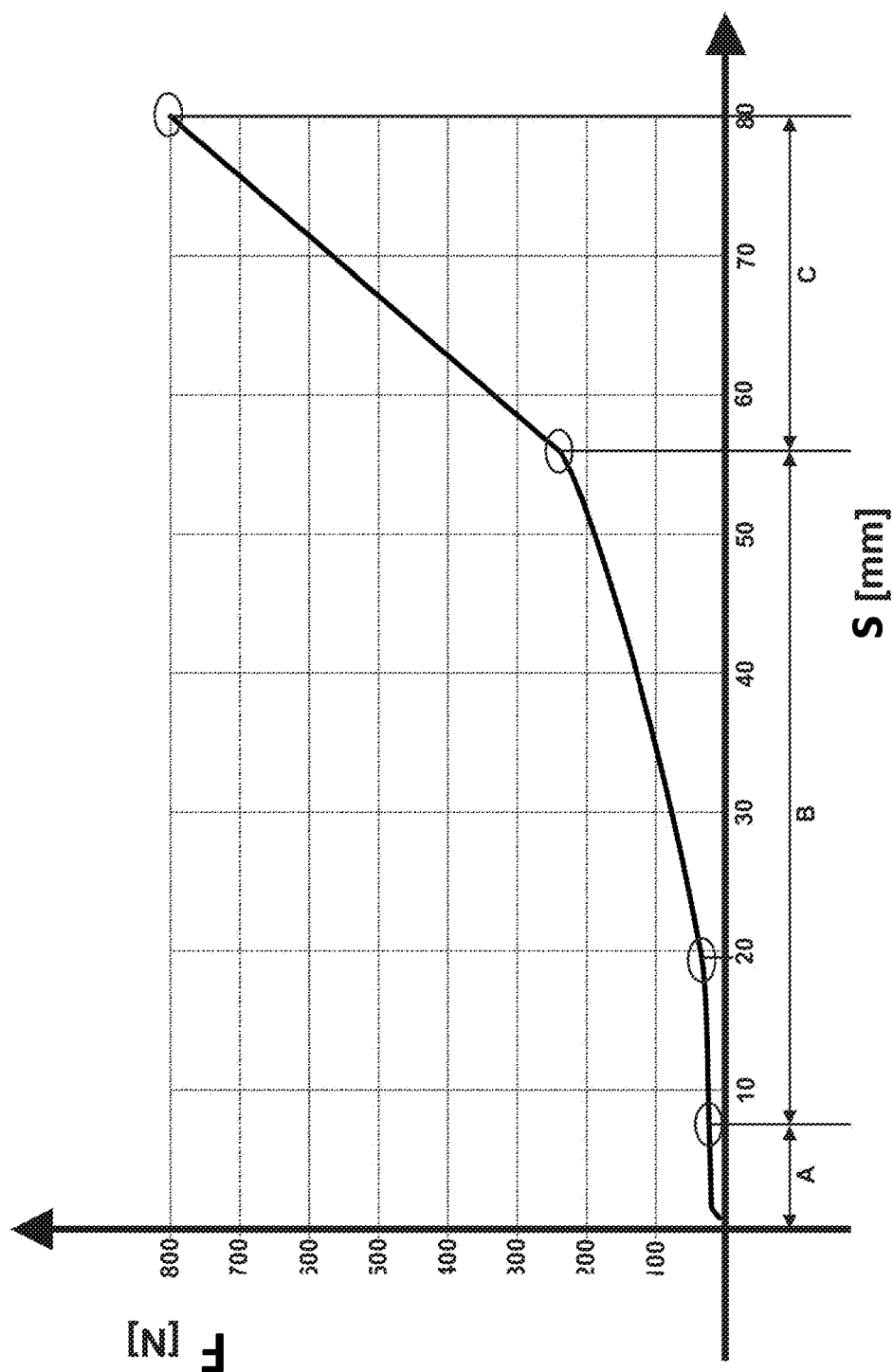
FIG. 5 shows an exemplary simulation characteristic of the pedal simulation device according to the third exemplary embodiment.

FIG. 5 shows a possible simulation characteristic that refers to the example according to FIG. 4. A progression of the resetting forces F via a displacement path s of the brake pedal (or via a so-called pedal stroke) is shown here in a known manner. This actuation paths can correspond to a displacement path of the piston 44 or be converted into it.

It can be seen that, at the beginning of the pedal actuation, a very flat linear region A is first traversed. This is the initial actuation phase, in which it is substantially the intermediate return element 100 that is deformed. Then begins the first actuation phase (region B in FIG. 5), which extends over a comparatively large actuation path s of the brake pedal 12. During this actuation phase, it is substantially the first return element 54, which defines a nonlinear progressive course of the simulation characteristic, that is deformed. A gently increasing smooth braking process is thus suggested to the driver. The second actuation phase (region C in FIG. 5), in which it is substantially the second return element 56 that is deformed, begins as soon as the coupling unit 58 enters into mechanically rigid abutment with the abutment region 64. It can be seen that this results in a substantially more pronounced increase in the simulation characteristic compared to the preceding actuation phases. The progression of this increase is also linear in order to suggest a significant brake operation to the driver while generating large braking forces.

As explained above, the secondary abutment region 102 and the damping element 112 can also be optionally provided. This would have the effect that, at the end of the second actuation phase in the region C, the simulation characteristic would again not run linearly and, in particular, flatten off degressively. However, this would only affect a relatively short pedal path s of a few millimeters.

All in all, it can be seen that the first actuation phase includes a pedal actuation path s of a total of approximately 50 mm, whereas the second actuation phase includes a pedal actuation path s of a total of approximately 15 mm. The initial actuation phase, on the other hand, involves a pedal actuation path of only between 5 mm and 10 mm.

Figure 6:
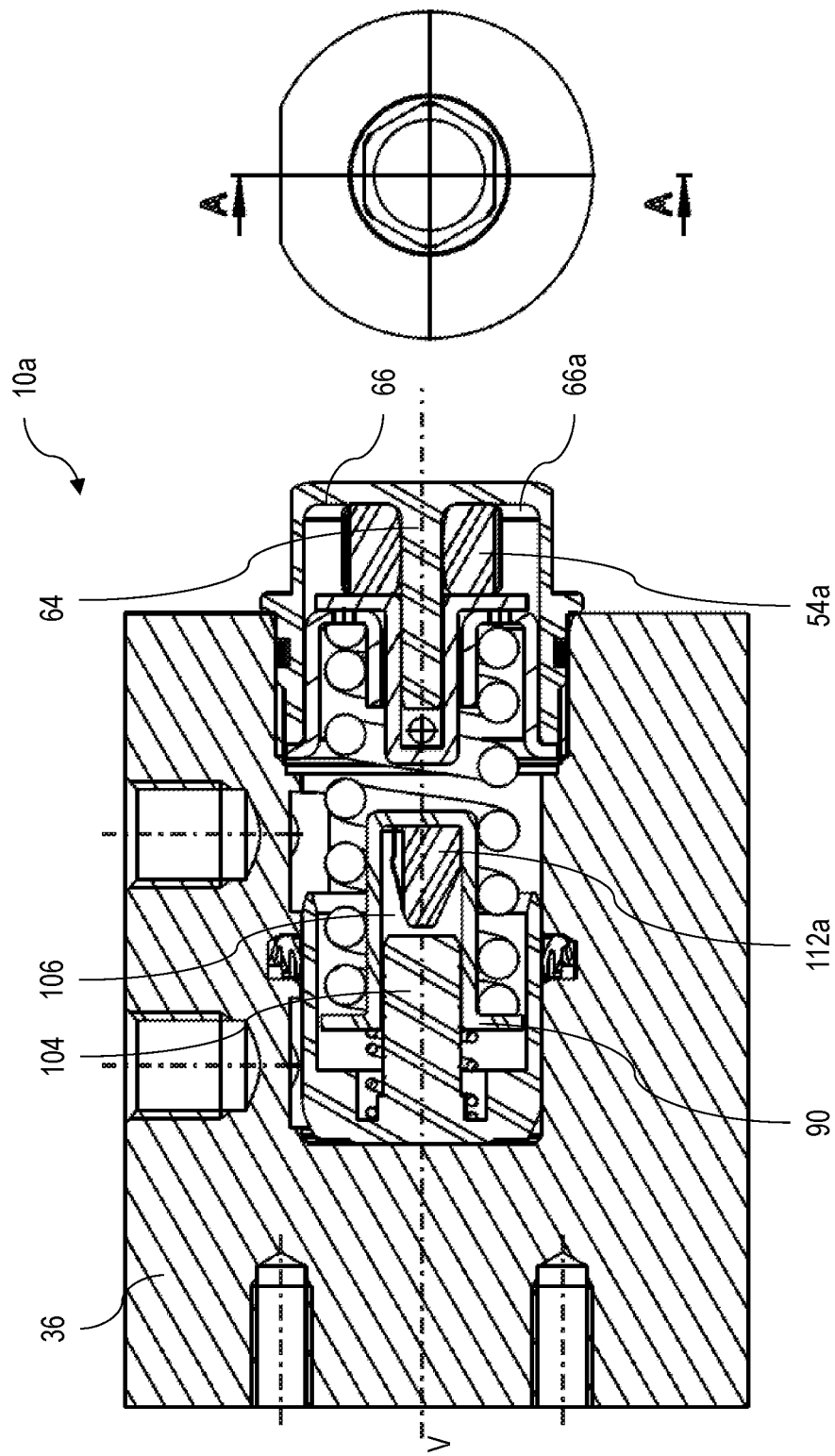
FIG. 6 shows a pedal simulation device according to a fourth exemplary embodiment in a sectional view containing the displacement axis.

FIG. 6 shows a fourth exemplary embodiment of an alternative pedal simulation device 10a, which is based on the principle of the third exemplary embodiment according to FIG. 4 and essentially shows an arrangement that is mirrored horizontally relative to the illustration in FIG. 4.

In detail, it can be seen in FIG. 6 that an alternative damping element 112a is provided that is located within the central recess 106 and whose structural constitution is described in greater detail below with reference to FIG. 7. The damping element 112a is attached to the intermediate coupling unit 90 so as to face toward the guide projection 104. The damping element 112a can be provided instead of or together with the damping element 112 that is described in the third embodiment. Furthermore, it can be seen in FIG. 6 that an alternative return element 54a is provided that has a nonlinear, progressive simulation characteristic in the case of pressure deformation along the displacement axis V. The alternative return element 54a is described further below with reference to FIG. 8.

In FIG. 7, the damping element 112a is shown as a three-bladed arrowhead-shaped body having a longitudinal through hole, it being possible for exemplary embodiments having only one, two, or more than three blades to be provided. The damping element 112a further comprises two deformation portions 112a-1, 112a-2 which, in turn, have different deformation resistances.

Specifically, the wing portion forms the first deformation portion 112a-1 having a comparatively small deformation resistance, i.e., that is embodied as a hard spring portion. The second deformation portion 112a-2 has a lower deformation resistance and a smaller diameter compared to the first deformation portion 112a-1. Furthermore, it provides a harder spring portion as compared to the first deformation portion 112a-1. The second deformation portion 112a-2 is also partially received in the central recess 106. It can be seen in FIG. 6 that there is an interference fit, and the central recess 106 still provides sufficient clearance in the initial position shown to accommodate the deformation portion 112a-2 and, in particular, a radial outward force resulting from a deformation.

In FIG. 8, the alternative return element 54a is shown as a cylindrical or annular body of a rubber elastic material, i.e., a rubber spring element. Guide or locking grooves 54a-1, 54a-2 extending in the axial direction are provided on the inner and on the outer periphery that are each offset by 90° in this exemplary embodiment. In other words, the inner periphery has two first guide grooves or securing grooves 54a-1 that lie opposite a first cross-sectional line and the outer periphery has two second guide or securing grooves 54a-2 that lie opposite a second cross-sectional line, the cross-sectional lines being orthogonal to one another and to the displacement axis v or to the axis of the alternative return element 54a. The guiding or securing function results from the cooperation, indicated in FIG. 6, with a corresponding guide rail (not shown) on the abutment region 64 and with a corresponding guide rail 66a that extends orthogonally to the displacement axis v on the bottom surface 66.

It should be noted that the provision of the damping element 112a is purely optional, and that the embodiment according to FIG. 6 can also be implemented without this element. However, the optional addition of this feature offers the advantage, for example, that a defined and, above all, damped completion of the braking process is suggested to the driver toward the end particularly in the case of mechanical transmission ratios of greater than 4:1.

The invention claimed is:

1. A pedal simulation device, comprising:
a housing;
an abutment region that is coupled with the housing in a substantially rigid manner;
a piston that is received in the housing and can be moved in a direction of actuation by passing through successive first and second actuation phases;
a return device that is configured to exert a restorative force on the piston that acts counter to the displacement of the piston in the direction of actuation;
the return device comprising the following;
a first elastically deformable return element having a substantially nonlinear spring characteristic, a second elastically deformable return element having a substantially linear spring characteristic, and
a coupling unit,
wherein the first return element is supported with a first end region on the coupling unit and with a second end region on a bottom region of the housing,
wherein the coupling unit can be displaced during the first actuation phase of the piston under deformation of predominantly or substantially exclusively the first return element,
wherein the coupling unit is designed to abut against the abutment region upon completion of the first actuation phase in such a way that further displacement in the direction of actuation is prevented, and
wherein the piston is configured so as to be displaced further in the direction of actuation when passing through the second actuation phase under deformation of predominantly or substantially exclusively the second return element.

2. The pedal simulation device as set forth in claim 1, wherein the abutment region is integrally formed with the housing.

3. The pedal simulation device as set forth in claim 1, wherein the first return element is designed to maintain a substantially constant state of deformation during the second actuation phase.

4. The pedal simulation device as set forth in claim 1, wherein the first and second return elements are arranged so as to act in series.

5. The pedal simulation device as set forth in claim 1, wherein the second return element is supported with a first end region on the piston and with a second end region on the coupling unit.

6. The pedal simulation device as set forth in claim 1, wherein the first return element has a lower deformation resistance than the second return element, and wherein this ratio of deformation resistances is maintained at least during the first actuation phase.

7. The pedal simulation device as set forth in claim 1, wherein the first return element comprises a rubber spring element that assumes a substantially bias-free state when the piston is in a non-actuated state.

8. The pedal simulation device as set forth in claim 1, wherein the second return element comprises a spiral spring element.

9. The pedal simulation device as set forth in claim 1, wherein the abutment region and the coupling unit can axially overlap one another, it being possible to change an axial overlap length (L) of these elements in accordance with a displacement of the piston in the first direction of actuation.

10. The pedal simulation device as set forth in claim 1, wherein the abutment region is at least partially received or receivable in a receiving region of the coupling unit, and wherein the abutment region comprises an abutment surface and the receiving region comprises a contact surface, it being possible for the contact surface to be brought into contact with the abutment surface upon completion of the first actuation phase.

11. The pedal simulation device as set forth in claim 1, wherein the first and second elastically deformable return elements do not axially overlap one another.

12. The pedal simulation device as set forth in claim 1, wherein the coupling unit is supported on a guide region of the abutment region such that the guide region guides the coupling unit in an at least partially displaceable manner during the piston displacement in the first actuation phase.

13. A pedal simulation device, comprising:
a housing;
an abutment region that is coupled with the housing in a substantially rigid manner;
a piston that is received in the housing and can be moved in a direction of actuation by passing through successive first and second actuation phases;
a return device that is configured to exert a restorative force on the piston that acts counter to the displacement of the piston in the direction of actuation;
the return device comprising the following:
a first elastically deformable return element having a substantially nonlinear spring characteristic,
a second elastically deformable return element having a substantially linear spring characteristic,
a coupling unit, and
an intermediate coupling unit via which the piston is supported on the coupling unit, the second return element being supported on the intermediate coupling unit at least in the event of the piston displacement in the direction of actuation,
wherein the coupling unit can be displaced during the first actuation phase of the piston under deformation of predominantly or substantially exclusively the first return element,
wherein the coupling unit is designed to abut against the abutment region upon completion of the first actuation phase in such a way that further displacement in the direction of actuation is prevented, and
wherein the piston is configured so as to be displaced further in the direction of actuation when passing through the second actuation phase under deformation of predominantly or substantially exclusively the second return element.

14. The pedal simulation device as set forth in claim 13, wherein the intermediate coupling unit comprises an intermediate return element that has a lower deformation resistance than the first and/or the second return element.

15. The pedal simulation device as set forth in claim 14, wherein the intermediate coupling unit is arranged such that the intermediate return element is supported on the piston and is in contact or can be brought into contact therewith.

16. The pedal simulation device as set forth in claim 13, wherein the intermediate coupling unit is arranged such that it can be brought into contact with the coupling unit and with the abutment region at least as a result of an actuation of the brake pedal.

* * * * *